Aug. 16, 1938.    W. L. MORRIS ET AL    2,126,909
SOIL CONDITIONER
Filed April 17, 1937    2 Sheets—Sheet 1
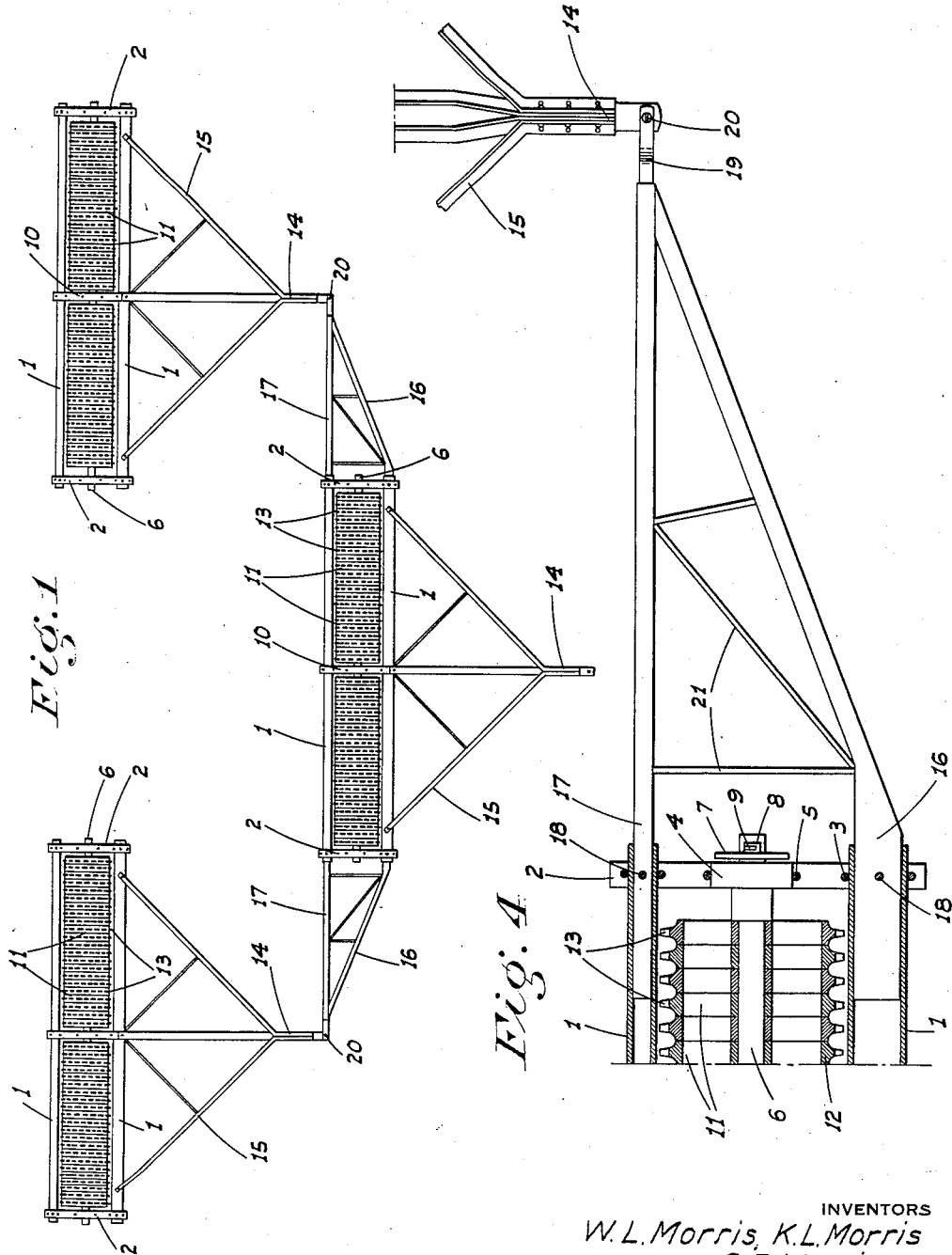
INVENTORS
W. L. Morris, K. L. Morris
and G. E. Morris
BY
ATTORNEY Aug. 16, 1938.　　W. L. MORRIS ET AL　　2,126,909
SOIL CONDITIONER
Filed April 17, 1937　　2 Sheets-Sheet 2
INVENTORS
W. L. Morris, K. L. Morris
and G. E. Morris
BY
ATTORNEY Patented Aug. 16, 1938

2,126,909

UNITED STATES PATENT OFFICE 2,126,909

SOIL CONDITIONER

Warren L. Morris, Kenneth L. Morris, and Glenn E. Morris, Butte City, Calif.

Application April 17, 1937, Serial No. 137,528

2 Claims. (Cl. 55—77)

This invention relates generally to a soil conditioning implement and, in particular, is directed to an implement including a rotary unit for use in connection with sugar beet culture.

Persons engaged in raising sugar beets have encountered certain problems which have been difficult to overcome, one of these problems being the crusting over of the surface of the soil after seeding but before the seedling plants have come through the surface. This so called crusting over is caused by heavy rains and is prevalent in many beet growing areas due to the existence there of certain types of soil which crust readily.

It is therefore the principal objects of our invention to provide an implement which will effectively break up or crack the encrusted surface without deep penetration which would injure the sprouting seeds, and which implement may also be used to pulverize the soil in a beet field after cultivation thereof and after the plants have obtained some growth. We thus have produced a dual-purpose implement.

A further object of our invention is to provide an implement which may be used either in single or multiple gangs and to provide removable connections of unique construction for use when multiple gangs are employed.

A further object of the invention is to produce a simple and inexpensive device and yet one which will be exceedingly effective for the purpose for which it is designed.

These objects we accomplish by means of such structure and relative arrangement of parts as will fully appear by a perusal of the following spcification and claims.

In the drawings similar characters of reference indicate corresponding parts in the several views.

Figure 1 is a plan view of our improved implement arranged in multiple gangs.

Figure 2 is an enlarged end view of the improved implement.

Figure 3 is a fragmentary section taken on line 3—3 of Fig. 2.

Figure 4 is a fragmentary plan view, partly in section illustrating one of the horizontal extension frames connected between one end of one gang and the tongue of another or trailing gang.

Referring now more particularly to the characters of reference on the drawings, the implement comprises a rectangular frame including relatively long box beams 1 at the front and back and a pair of vertically spaced frame elements 2 extending between the beams 1 at each end thereof. Bolts 3 maintain the box beams and spaced frame elements in rigid connection, the ends of the beams 1 remaining open for the purpose hereinafter described.

Intermediate their ends each pair of frame elements 2 is spread apart and a journal block 4 secured therebetween by means of bolts 5. A shaft 6 extends the full length of the implement frame centrally between the box beams and is journaled at each end in blocks 4, the shaft projecting a short distance beyond each block. A washer 7 is disposed on each projecting end of the shaft in face to face relation with the adjacent block. Ears 8 extend outward from each washer in diametrally opposed relation and are drilled to receive a cross pin 9, the shaft being likewise drilled to receive the pin. Thus, the shaft cannot shift axially and as the washers turn with the shaft and the pin and washer are relatively fixed, wear on the washer is reduced. A center journal unit 10 supports the shaft intermediate its ends.

A plurality of discs 11, of relatively large diameter are mounted for independent rotation on the shaft, in close relationship, each disc having a rim 12 from which projects teeth 13 of less width than the rim and of rip saw tooth configuration. The discs are of cast metal and are relatively light in weight due to the "spider" construction thereof.

A tongue 14 extends outward from the front beam 1 intermediate the ends thereof and at right angles thereto. Suitable diagonal bracing 15 is employed to maintain the tongue rigid.

When our implement is used to break up or crack encrusted soil surfaces, as in beet fields, the implement is drawn in a direction to revolve the toothed discs in the direction shown by the arrow in Fig. 2 or so that the points of the teeth face rearwardly at the ground. As the implement moves in such direction, the teeth as they reach the ground surface first penetrate the said surface a short distance as indicated at A. Then, with continued rotation of the discs, the points of the teeth lift up portions of the encrusted surface, as at B, thus cracking the ground surface in all directions. It is through such cracked or broken up surface that the seedling beet plants grow.

Since the discs themselves are wider than the teeth and are all of the same diameter and disposed in close relation to each other, they form a practically continuous ground engaging surface, preventing the ground being dug into for a depth greater than that of the teeth, and which would be detrimental to our purpose.

After beet plants have risen above the ground surface, the field is cultivated between the rows and the cultivated soil in the form of clods must then be pulverized. To accomplish this, we merely invert the implement so that the discs will rotate in the other direction as the implement is drawn over the ground. Due to the particular shape of the teeth, the discs when so rotated will cause the clods to be pulverized without injury to the small beet plants over which the implement must necessarily pass.

If it is desired to use the implement in multiple gangs in order to cover a wide area, the gangs are disposed and connected together in the manner shown in Fig. 1 and by means of extension frames which will now be described in detail. In order to position the trailing gangs to the side and rearward of the leading gang it is necessary that such extension frames be mounted on said leading gang on each side thereof.

Each extension frame comprises two extension elements 16 and 17 respectively and which, at their inner ends, are rectangular and are disposed so as to removably engage some distance within the open ends of beams 1 of the leading gang. Locking pins 18 maintain the extension elements 16 and 17 secured in removable connection with the beams. The extension element 16 converges toward the element 17 and is connected thereto at the outer end. A clevis 19 is mounted on the outer end of the extension frame and is removably secured by a pin 20 to the tongue 14 of a trailing gang. Each extension frame also includes suitable bracing 21 as shown.

The tongue of the leading gang is of course directly connected to the draw bar of a tractor.

The gangs are all identical in size and construction, so it is immaterial which is used as the leading gang and which the trailing gangs.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a multiple gang agricultural implement, separate front and rear gang frames disposed in laterally offset relation, draft means on the front frame, a tongue projecting forwardly from the rear frame centrally of its ends, an extension frame projecting laterally from the end of the front frame nearest the rear frame, means rigidly but removably securing the extension frame on said front gang frame, and means removably pivoting the outer ends of the extension frame and tongue together; said extension frame securing means comprising spaced projecting elements on the inner end of the extension frame, the front gang-frame having correspondingly spaced sockets to removably receive the elements, and pins removably passing through the walls of the sockets and said elements.

2. An agricultural implement comprising a horizontal shaft, a plurality of ground supported discs on the shaft, each disc having a series of radially projecting teeth about the periphery thereof and all facing in one direction circumferentially of the disc, a horizontal frame including end members in which the ends of the shaft are mounted and symmetrically disposed relative to said shaft, and a horizontal beam connecting said members beyond the discs at the level of the shaft and a horizontal draft tongue rigid with the beam and substantially in the same horizontal plane as said beam.

WARREN L. MORRIS.
KENNETH L. MORRIS.
GLENN E. MORRIS.